(12) United States Patent
Helle

(10) Patent No.: US 10,078,420 B2
(45) Date of Patent: Sep. 18, 2018

(54) ELECTRONIC DEVICES, ASSOCIATED APPARATUS AND METHODS

(75) Inventor: Seppo Ilmari Helle, Paimio (FI)

(73) Assignee: Nokia Technologies Oy, Espoo (FI)

( * ) Notice: Subject to any disclaimer, the term of this patent is extended or adjusted under 35 U.S.C. 154(b) by 953 days.

(21) Appl. No.: 13/422,525

(22) Filed: Mar. 16, 2012

(65) Prior Publication Data

US 2013/0246970 A1    Sep. 19, 2013

(51) Int. Cl.
*G06F 3/0482* (2013.01)
*G06F 3/0488* (2013.01)
*G06F 3/0484* (2013.01)
*G11B 27/32* (2006.01)
*G11B 27/34* (2006.01)

(52) U.S. Cl.
CPC ........ *G06F 3/0482* (2013.01); *G06F 3/04847* (2013.01); *G06F 3/04883* (2013.01); *G06F 3/04886* (2013.01); *G06F 2203/04803* (2013.01); *G06F 2203/04806* (2013.01); *G11B 27/322* (2013.01); *G11B 27/34* (2013.01)

(58) Field of Classification Search
CPC ............. G06F 3/03549; G06F 3/03548; G06F 3/0482; G06F 3/04883; G06F 3/0488
USPC ........ 715/808, 822, 845, 828, 830, 831, 829
See application file for complete search history.

(56) References Cited

U.S. PATENT DOCUMENTS

| | | | |
|---|---|---|---|
| 5,951,298 A * | 9/1999 | Werzberger | 434/178 |
| 8,351,989 B2 * | 1/2013 | Ahn et al. | 455/566 |
| 8,432,367 B2 * | 4/2013 | Li et al. | 345/173 |
| 8,499,243 B2 * | 7/2013 | Yuki | 715/735 |
| 2004/0100479 A1 * | 5/2004 | Nakano et al. | 345/700 |
| 2010/0146451 A1 * | 6/2010 | Jun-Dong et al. | 715/841 |
| 2010/0162180 A1 * | 6/2010 | Dunnam et al. | 715/863 |
| 2010/0281374 A1 | 11/2010 | Schulz et al. | |
| 2011/0185309 A1 | 7/2011 | Challinor et al. | |
| 2011/0205163 A1 * | 8/2011 | Hinckley et al. | 345/173 |
| 2011/0209088 A1 | 8/2011 | Hinckley et al. | |
| 2012/0131519 A1 * | 5/2012 | Jitkoff | 715/863 |
| 2012/0166990 A1 * | 6/2012 | Jeon et al. | 715/769 |

(Continued)

FOREIGN PATENT DOCUMENTS

| | | |
|---|---|---|
| EP | 2 112 588 A1 | 10/2009 |
| EP | 2 116 927 A2 | 11/2009 |
| EP | 2 166 445 A2 | 3/2010 |

OTHER PUBLICATIONS

Customer Review from Amazon.com, dated Jun. 1, 2011, downloaded from http://www.amazon.com/review/R3L6LBC7KLXXJE.

(Continued)

*Primary Examiner* — Justin S Lee
(74) *Attorney, Agent, or Firm* — Alston & Bird LLP

(57) ABSTRACT

An apparatus comprising: a processor; and a memory including computer program code, the memory and the computer program code configured to, with the processor, cause the apparatus to perform at least the following: in response to detecting a progressive dragging input gesture provided by a user via a graphical user interface, enable: revealing one or more menu items, such that the one or more revealed menu items are visible; highlighting at least one said visible menu item in correspondence with the progressive dragging input gesture; and selecting the highlighted menu item in response to detecting the completion of the progressive dragging input gesture.

20 Claims, 7 Drawing Sheets

(56) References Cited

U.S. PATENT DOCUMENTS

| | | | |
|---|---|---|---|
| 2012/0180001 A1* | 7/2012 | Griffin | G06F 3/04883 |
| | | | 715/863 |
| 2012/0236037 A1* | 9/2012 | Lessing et al. | 345/661 |
| 2013/0047104 A1* | 2/2013 | Chen | 715/765 |
| 2013/0117689 A1* | 5/2013 | Lessing et al. | 715/752 |
| 2013/0215061 A1* | 8/2013 | Rydenhag et al. | 345/173 |
| 2013/0227482 A1* | 8/2013 | Thorsander et al. | 715/821 |
| 2013/0227495 A1* | 8/2013 | Rydenhag et al. | 715/863 |

OTHER PUBLICATIONS

International Search Report and Written Opinion for Application No. PCT/IB2013/051300; dated Nov. 29, 2013.
Extended European Search Report for Application No. 13760400.5 dated Sep. 30, 2015; 3 pages.

* cited by examiner

ELECTRONIC DEVICES, ASSOCIATED APPARATUS AND METHODS

TECHNICAL FIELD

The present disclosure relates to the field of electronic devices, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs) and tablet personal computers.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

It is common for electronic devices to provide a user interface (e.g. a graphical user interface). A user interface may enable a user to interact with an electronic device, for example, to open applications using application icons, enter commands, to select menu items from a menu, or to enter characters using a virtual keypad. The user may interact with the user interface directly (e.g. by using a stylus, such as a finger, on a touch screen) or indirectly (e.g. using a mouse to control a cursor).

The listing or discussion of a prior-published document or any background in this specification should not necessarily be taken as an acknowledgement that the document or background is part of the state of the art or is common general knowledge.

SUMMARY

In a first aspect, there is provided an apparatus comprising:
  a processor; and
  a memory including computer program code,
  the memory and the computer program code configured to, with the processor, cause the apparatus to perform at least the following:
    in response to detecting a progressive dragging input gesture provided by a user via a graphical user interface, enable:
      revealing one or more menu items, such that the one or more revealed menu items are visible;
      highlighting at least one said visible menu item in correspondence with the progressive dragging input gesture; and
      selecting the highlighted menu item in response to detecting the completion of the progressive dragging input gesture.

It will be appreciated that enabling the revealing, highlighting and selecting may comprise processing signalling which is transmitted to and received from the graphical user interface. The revealing of the menu items to be visible may not necessarily mean that the menu items are full/completely visible (e.g. the visible menu items may be partially visible).

The revealing of the one or more menu items may be performed by moving a graphical user interface element. For example, the apparatus may be configured to: in response to detecting a progressive dragging input gesture provided by a user via a graphical user interface, enable: moving a displayed user interface element of the graphical user interface to reveal the one or more menu items, such that the one or more revealed menu items are visible.

The displayed user interface element may be, for example, a discrete graphical element, a whole screen, a window, an application screen, a home screen, an application launching screen, a button or an icon.

The revealed menu items form part of a menu, the menu comprising a plurality of menu items. The revealed menu items form part of a menu, the menu comprising one menu item. For example, an embodiment may comprise two modes (e.g. sound on and sound off), which are implemented one at a time. In this case, the menu may allow the user to toggle between these two modes by having the menu make available the option which is not currently implemented (e.g. if the sound was off, the menu item may correspond to the 'sound on' option).

The home screen may be considered to be a first screen of information displayed when the electronic device is started. A home screen may comprise one or more icons corresponding to applications (email application, telephone application), files, folders, and/or functions (e.g. settings menus). That is, a home screen may be dedicated to providing the user with access to an array of icons corresponding to applications, files, folders and/or functions. A home screen may be configured to allow the user to open applications. A home screen may be considered to be a basic/primary screen displayed when no user applications are running (e.g. when the electronic device is in a fully active mode), or when any running applications are minimized. That is, a home screen may be visible (e.g. partially or fully visible) when an application or window is not filling up the entire screen. A home screen may be an application launching screen.

An application screen may be a screen/window dedicated to provide a user interface with a particular application.

Highlighting may be considered to be enabling provisional selection of a menu item. Highlighting may or may not comprise indicating to the user which menu item is highlighted (e.g. by changing the colour of the menu item, or providing an indicator). One or more or all of the revealed menu items may be highlighted. Highlighting a menu item may comprise distinguishing the menu item with respect to other menu items (e.g. by making the highlighted menu item a different colour to at least one other non-highlighted menu item). Highlighting may be such that it is apparent to a user which menu item is provisionally selected, by for example, the nature of the menu item itself and/or by the fact that it is revealed for selection (having previously been hidden). Highlighting may or may not comprise providing one or more of an audio indication (e.g. a beep, or a message announcing the highlighted item), a visual indication and a tactile (e.g. haptic feedback) indication.

One or more of the revealed menu items may be configured to not be available for selection/highlighting. For example, a menu may comprise a copy menu item which is available for selection/highlighting only when text (or another object) is highlighted in a text entry window user interface element. When text is not highlighted in text entry window user interface element, the copy menu item may be configured to be revealed but not available for highlighting/selection.

A menu item may comprise an icon, text, an image, a phrase. A menu item may be associated with a function.

The apparatus may be configured to enable the one or more menu items to be revealed progressively in correspondence with the progressive dragging input gesture. The highlighting and selection of a function may be performed using a single sliding gesture. That is, the progressive dragging input gesture may comprise a single sliding gesture. The progressive dragging input gesture may be spatially associated with the user interface element (e.g. to move a user interface element the user may have to provide spatial input interaction with via the user interface element).

The apparatus may be configured to respond to progressive dragging input in a two dimensional plane, wherein input in a first direction of the two dimensional plane enables moving of the user interface element in the first direction (e.g. along an up-down axis) to reveal the one or more menu items and input in a second perpendicular direction (e.g. along a left-right axis) of the two dimensional plane enables correspondingly highlighting of a revealed menu item (input in the second direction may or may not correspondingly move the user interface element).

The apparatus may be configured to respond to progressive dragging input in a two dimensional plane, wherein input in a first direction of the two dimensional plane (e.g. along a left-right axis) enables moving of the user interface element in the first direction to reveal the one or more menu items and input in a second perpendicular direction (e.g. along an up-down axis) of the two dimensional plane enables correspondingly highlighting of a revealed menu item listed in the second perpendicular direction. That is, the progressive dragging input may comprise: a portion wherein the user interface element is dragged in a revealing direction such that the one or more menu items are revealed; and/or a portion wherein the user interface element is dragged in a highlighting direction such that the one or more visible menu items are progressively highlighted, the highlighting direction being perpendicular to the revealing direction.

The apparatus may be configured to respond to progressive dragging input along an axis (e.g. an up-down axis), wherein input in a first direction (e.g. in the down direction) along the axis enables moving of the user interface element in the first direction to reveal one or more of the menu items as well as enables correspondingly highlighting a revealed menu item. The menu items may or may not be listed in the same direction (e.g. the menu items may be listed in a left-right axis).

The apparatus may be configured to respond to progressive dragging input along an axis, wherein input in a first direction (e.g. the down direction) along the axis enables moving of the user interface element in the first direction to reveal one or more of the menu items as well as enables correspondingly highlighting a revealed menu item listed in first direction.

The apparatus may be configured to respond to progressive dragging input along an axis (e.g. a left-right axis), wherein: input in a first direction (e.g. a right direction) along the axis enables moving of the user interface element in the first direction to reveal the one or more menu items as well as enables correspondingly highlighting of a revealed menu item; and input in the second opposing direction (e.g. a left direction) of the axis enables moving of the user interface element in the opposing direction to hide a previously revealed one or more menu item. That is, the progressive dragging input may comprise: a portion wherein the user interface element is dragged in a revealing direction such that the one or more visible menu items are progressively revealed; and/or a portion wherein the user interface element is dragged in a hiding direction such that the one or more visible menu items are progressively hidden. The hiding direction may be opposite to the revealing direction.

The apparatus may be configured to enable two or more of the menu items to be revealed simultaneously in the same direction as the direction of progressive dragging input.

The apparatus may be configured to enable two or more of the menu items to be revealed simultaneously in a perpendicular direction to the direction of progressive dragging input.

The apparatus may be configured to reveal and highlight further menu items whilst hiding previously revealed menu items in a scrolling manner in correspondence with the progressive dragging input gesture.

It will be appreciated that space previously occupied by user interface element, or the space through which the user interface element moves, may be used to reveal (in certain cases progressively) menu items.

The highlighted menu item may be the last revealed visible menu item.

The one or more menu items may be associated with the user interface element.

The one or more revealed menu items may be configured to be stationary when the user interface element is being moved (e.g. fixed with respect to the graphical user interface, the background of the graphical user interface, display and/or device). The apparatus may be configured to enable the position of the one or more menu items to be fixed with respect to the user interface element when the user interface element is being moved.

The apparatus may be configured not to implement a function (e.g. any function associated with a menu item) in response to at least one of:
  a cancel menu item being selected (e.g. the menu items comprising a cancel menu item);
  providing a user input via a cancellation area; and
  detecting a particular cancel gesture (e.g. a multi-touch gesture, a gesture not exceeding a predetermined time threshold, a gesture exceeding a predetermined time threshold).

The apparatus may be configured not to select a menu item (e.g. any menu item) in response to at least one of:
  detecting that no menu item is highlighted;
  detecting that the user interface element has been returned to its original position when the completion of the progressive dragging input gesture is detected (e.g. if the user has dragged the user interface element to reveal a menu and then dragged the user interface element back to hide the menu before completing the progressive dragging input gesture).

The menu items may be arranged in a one-dimensional, two-dimensional or three-dimensional array.

It will be appreciated that the completion of the progressive dragging input gesture may be associated with the release of the user interface element (e.g. by moving the stylus or finger away from the touch screen, or releasing a mouse button). For example, when a user has moved the user interface element and releases the user interface element by removing his finger from the touch screen, the apparatus may be configured to detect the completion of the progressive dragging input gesture and select the highlighted menu item.

Selecting the highlighted menu item may be enabled when the menu item is highlighted for a time period exceeding a predetermined threshold. Where the menu item is not highlighted for a time period exceeding a predetermined threshold, selection may be prevented. This may prevent the user inadvertently selecting an unwanted menu item.

The apparatus may be configured to detect single touch input gestures and multi-touch gestures, and wherein the apparatus is configured to recognise multi-touch gestures as a said progressive dragging input gesture The apparatus may be configured to automatically implement the selected menu item (e.g. by performing the function associated with the selected menu item).

A progressive dragging input gesture may be distinguished from other available user inputs (e.g. associated with other available functions such as opening an application by clicking on an application icon) based on one or more of:
- position of user input (e.g. there may be a portion of the display (e.g. a tab) which the user selects to initiate a progressive dragging input gesture);
- duration of user input (e.g. an interaction with a user interface element above a predetermined time threshold may be recognised as a progressive dragging input gesture, whereas an interaction of the user interface element below the predetermined time threshold may be recognised as selecting that user interface element (e.g. to open an application associated with an application icon)); and
- type of user input (e.g. a multi-touch or hover gesture may be recognised as a progressive dragging input gesture whereas other types of gesture, such as single-contact or contact gestures, may be used to perform other functions).

The menu items may be related to the user interface element. For example when the progressive dragging input gesture moves an application icon user interface element the options may be related to that application icon user interface element (e.g. open the application, delete the application, rename the application, update the application, open application settings). The menu items may not be related to the user interface element. For example, they may enable the user to change the settings of the device, or switch to other available applications. A menu item may relate to a particular function, a mode of the device, a user application, a particular file (e.g. mp3 music file), or a settings item (e.g. to allow the user to configure the device).

The menu items may be configurable by the user (e.g. user defined) or predetermined (e.g. by the operating system or application).

The apparatus may be or form part of at least one of the electronic device, a portable electronic device, circuitry for a portable electronic device, a television, a tablet computer, a laptop computer, a desktop computer, a mobile phone, a Smartphone, a tablet PC, a monitor, a car entertainment system, a satellite navigation system, a game controller, an automated teller machine, a cash machine, a personal digital assistant, a digital camera or a module for the same.

The apparatus may comprise a graphical user interface and/or a display.

The apparatus may be configured to enable detection of progressive dragging input gesture.

In a second aspect, there is provided a method, the method comprising:
in response to detecting a progressive dragging input gesture provided by a user via a graphical user interface, enabling:
- revealing one or more menu items, such that the one or more revealed menu items are visible;
- highlighting at least one said visible menu item in correspondence with the progressive dragging input gesture; and
- selecting the highlighted menu item in response to detecting the completion of the progressive dragging input gesture.

In a third aspect, there is provided a computer program comprising computer program code, the computer program code configured to:
in response to detecting a progressive dragging input gesture provided by a user via a graphical user interface, enable:
- revealing one or more menu items, such that the one or more revealed menu items are visible;
- highlighting at least one said visible menu item in correspondence with the progressive dragging input gesture; and
- selecting the highlighted menu item in response to detecting the completion of the progressive dragging input gesture.

The computer program may be stored on a storage media (e.g. on a CD, a DVD, a memory stick or other non-transitory medium). The computer program may be configured to run on a device or apparatus as an application. An application may be run by a device or apparatus via an operating system. The computer program may form part of a computer program product.

In a fourth aspect, there is provided an apparatus comprising:
means for enabling configured to, in response to detecting a progressive dragging input gesture provided by a user via a graphical user interface, enable:
- revealing one or more menu items, such that the one or more revealed menu items are visible;
- highlighting at least one said visible menu item in correspondence with the progressive dragging input gesture; and
- selecting the highlighted menu item in response to detecting the completion of the progressive dragging input gesture.

An apparatus may comprise:
- means for revealing configured to reveal one or more menu items, such that the one or more revealed menu items are visible;
- means for highlighting configured to highlight at least one said visible menu item in correspondence with the progressive dragging input gesture; and
- means for selecting configured to select the highlighted menu item in response to detecting the completion of the progressive dragging input gesture.

The present disclosure includes one or more corresponding aspects, embodiments or features in isolation or in various combinations whether or not specifically stated (including claimed) in that combination or in isolation. Corresponding means and corresponding function units (e.g. user interface element mover, a menu item highlighter, a menu item selector) for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EMBODIMENTS

Figure 1:
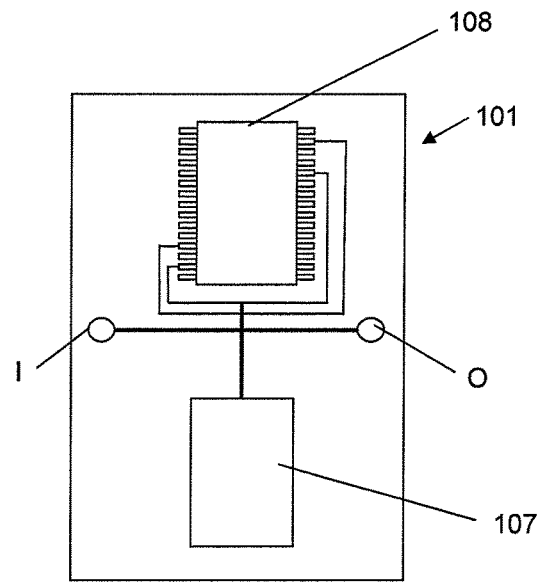
FIG. 1 depicts an embodiment comprising a number of electronic components, including memory and a processor.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It is common for an electronic device to have a user interface (which may or may not be graphically based) to allow a user to interact with the device. For example, the user may use a keyboard to enter text or icons to select and run applications. It is also common that a user interface comprises a touch screen which may be configured to provide a virtual keyboard, icons or menu items which may be selected (or otherwise interacted with) by pressing on the screen. For example, buttons and menus may be used to invoke functions. However, such user interface elements generally occupy a portion of the display area reducing the available area for other user elements. This may make it difficult to display all of the required information and/or user-selectable options on a display at the same time. Therefore, it may be beneficial to allow the user to move user interface elements on the display in order to reveal further options or menu items. This may allow the display area to be dedicated to a particular function, whilst allowing other functions to be readily accessible when required. It may also be beneficial to provide menu items which can be accessed using fewer input gestures (e.g. a single input gesture) to reduce the burden on the user. For example, using a single input gesture may be easier than navigating to a dedicated menu screen (e.g. using one or more navigation inputs) before selecting a menu item (using another input).

Example embodiments contained herein may be considered to provide a means of invoking menu items displayed on a screen (e.g. a touch screen) by allowing the user to reveal, highlight and select one or more menu items by moving a user interface element using a progressive dragging input gesture. This may allow the screen area dedicated to the menu items to be reduced as they become visible when the user wants to use the menu.

FIG. 1 shows an apparatus (101) comprising memory (107), a processor (108), input I and output O. In this embodiment only one processor and one memory are shown but it will be appreciated that other embodiments may utilise more than one processor and/or more than one memory (e.g. same or different processor/memory types).

In this embodiment the apparatus (101) is an application specific integrated circuit (ASIC) for a portable electronic device with a touch sensitive display. In other embodiments the apparatus (101) can be a module for such a device, or may be the device itself, wherein the processor (108) is a general purpose CPU of the device and the memory (107) is general purpose memory comprised by the device.

The input I allows for receipt of signalling to the apparatus 101 from further components, such as components of a portable electronic device (like the touch-sensitive display 240) or the like. The output O allows for onward provision of signalling from within the apparatus 101 to further components. In this embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more embodiments, provide an active coupling between the processor 108 and the memory 107 to allow the processor 108 to access the computer program code stored on the memory 107.

In this embodiment the input I, output O, processor 108 and memory 107 are all electrically connected to one another internally to allow for electrical communication between the respective components I, O, 108, 107. In this example the components are all located proximate to one another so as to be formed together as an ASIC, in other words, so as to be integrated together as a single chip/circuit that can be installed into an electronic device. In other embodiments one or more or all of the components may be located separately from one another.

It will be appreciated that the processor (108) and memory (107) storing computer program code may be considered to be a means for enabling configured to, in response to detecting a progressive dragging input gesture provided by a user via a graphical user interface, enable:
  revealing one or more menu items, such that the one or more revealed menu items are visible;
  highlighting at least one said visible menu item in correspondence with the progressive dragging input gesture; and
  selecting the highlighted menu item in response to detecting the completion of the progressive dragging input gesture.

Figure 2:
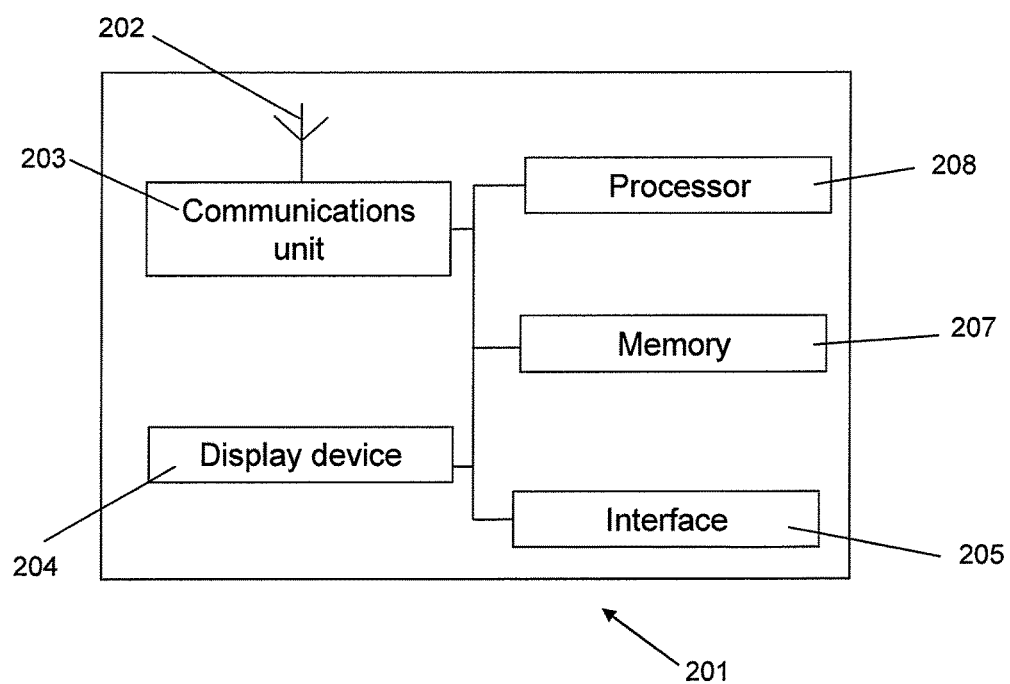
FIG. 2 depicts an embodiment comprising a number of electronic components, including memory, a processor and a communication unit.

FIG. 2 depicts an apparatus (201) of a further example embodiment, such as a mobile phone. In other example embodiments, the apparatus (201) may comprise a module for a mobile phone (or PDA or audio/video player), and may just comprise a suitably configured memory (207) and processor (208).

The example embodiment of FIG. 2, in this case, comprises a display device (204) such as, for example, a Liquid Crystal Display (LCD) or touch-screen user interface. The apparatus (201) of FIG. 2 is configured such that it may receive, include, and/or otherwise access data. For example, this example embodiment (201) comprises a communications unit (203), such as a receiver, transmitter, and/or transceiver, in communication with an antenna (202) for connecting to a wireless network and/or a port (not shown) for accepting a physical connection to a network, such that data may be received via one or more types of networks. This example embodiment comprises a memory (207) that stores data, possibly after being received via antenna (202) or port or after being generated at the user interface (205). The processor (208) may receive data from the user interface (205), from the memory (207), or from the communication unit (203). It will be appreciated that, in certain example embodiments, the display device (204) may incorporate the user interface (205). Regardless of the origin of the data, these data may be outputted to a user of apparatus (201) via the display device (204), and/or any other output devices provided with apparatus. The processor (208) may also store the data for later use in the memory (207). The memory (207) may store computer program code and/or applications which may be used to instruct/enable the processor (208) to perform functions (e.g. read, write, delete, edit or process data).

Figure 3A:
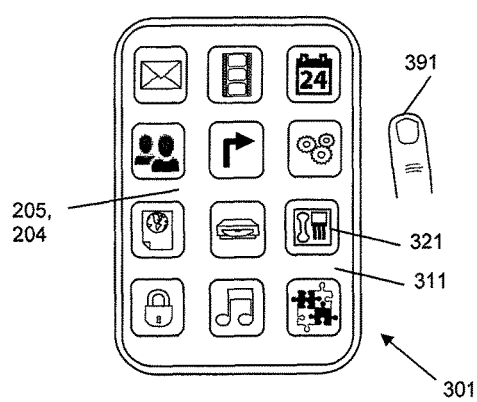
FIG. 3a-3e depicts an example embodiment of FIG. 2 comprising a mobile telephone.

FIG. 3a depicts an example embodiment of the apparatus depicted in FIG. 2 comprising a portable electronic communications device (301), e.g. such as a mobile phone, with a user interface comprising a touch-screen user interface (305, 304), a memory (not shown), a processor (not shown) and an antenna (not shown) for transmitting and/or receiving data (e.g. emails, textual messages, phone calls, information corresponding to web pages).

FIGS. 3a-3e depict the example embodiment of FIG. 3a as the user is interacting with the device. FIG. 3a depicts the home screen (311) of the electronic device (301) when the device is first turned on. In this case, the home screen may be considered to be an application launching screen. The home screen (311) depicts an array of icons (321) wherein each icon represents a different application available to the user. In this case the applications comprises, an email client, a movie player, a calendar application, a messaging application, a navigation application, a settings control application, a web browser application, a external device interface application, a telephone application, a locking application, an music player application, and a games application. It will be appreciated that the home screen may be considered to be a means for revealing configured to enable revealing one or more menu items, such that the one or more revealed menu items are visible.

In this case, the embodiment allows the icons (321) to be arranged in a number of different ways. For example, the icons (321) can be displayed in a default configuration/order, or in a configuration/order relating to when the corresponding application was last used (e.g. in an order corresponding to the times of last usage of the respective applications), or in a configuration/order relating to which applications are most used (e.g. the amount of usage of the applications overall, or the amount of usage in the last predetermined period of time, such as a week or a month).

This example embodiment (301) is configured to, in response to detecting a progressive dragging input gesture provided by a user via a graphical user interface, enable:
  moving a displayed user interface element (which in this case is the home screen (311)) of the graphical user interface to reveal one or more menu items, such that the one or more revealed menu items are visible;
  highlighting at least one said visible menu item in correspondence with the progressive dragging input gesture; and
  selecting the highlighted menu item in response to detecting the completion of the progressive dragging input gesture.

Figure 3B:
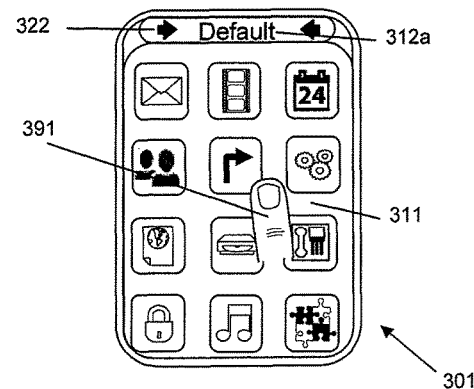

In FIG. 3b, the user has initiated a dragging gesture by contacting his finger (391) (or other stylus) on the surface of the touch screen (304) and by dragging his finger (391) down whilst remaining in contact with the touch screen (304) (it will be appreciated that other example embodiments may be configured to detect a stylus when the stylus is not in contact with the touch screen). In response to this progressive dragging input in a first direction, the embodiment is configured to move the displayed home screen user interface element (311) to reveal the first menu item option (312a) of the plurality of menu item options so that the revealed menu items (the menu items in this case corresponding to the available icon display configurations) are visible. In this case, the embodiment is configured such that the user perceives that the menu (312) is in the same plane as the home screen user interface element (311), and the menu is fixed with respect to the home screen user interface element as the home screen user interface element (311) moves. That is, the user perceives that the menu (312) is being dragged into view (from the top) as the home screen user interface element (311) is dragged down.

In this example embodiment, the revealed menu items form part of a menu comprising a plurality of menu items. It will be appreciated that the menu of other example embodiments may comprise a single menu item. For example, an embodiment may comprise two modes (e.g. sleep and normal), which are implemented one at a time. In this case, the menu may allow the user to toggle between these two modes by having the menu make available the option which is not currently implemented (e.g. when in sleep mode, the menu may comprise a 'normal mode' menu item, and when in normal mode, the menu item may comprise a 'sleep mode' menu item).

In this example, the most recently revealed item which is visible is highlighted. In the situation depicted in FIG. 3b, only the 'default' menu item (312a) has been revealed and so it is highlighted (indicated by two arrow indicators (322)). In this way, a said visible menu item of the plurality of menu items is highlighted in correspondence with the progressive dragging input gesture.

In this case, highlighting a menu item comprises distinguishing the menu item with respect to other menu items by using arrows to indicate the highlighted menu item. That is, the arrows may be considered to be a means for highlighting. It will be appreciated that other example embodiments may comprise other means for highlighting, for example, speakers to announce to the user which menu item is highlighted.

Figure 3C:
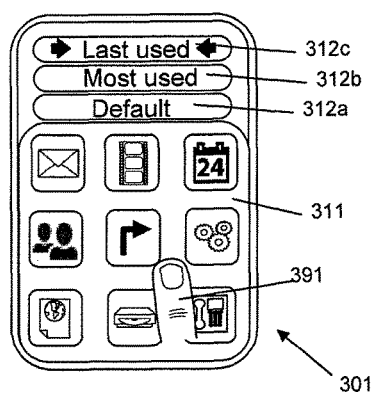
Figure 3D:
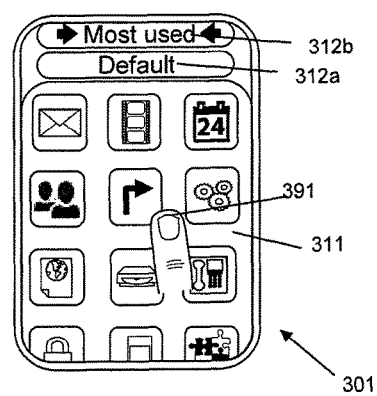

In FIG. 3c, the user has continued the dragging motion of FIG. 3b further along the same direction. This has revealed two more menu items: 'last used' (312b) and 'most used' (312c). In this case, the 'last used' menu item (312b) is the last revealed menu item which is visible and so it is highlighted. However, the user wishes to arrange the icons according to the 'most used' order. The menu item corresponding to this option has already been revealed and is visible. This embodiment is configured to enable input moving of the user interface element in the opposing direction (in the up direction, in this case) to hide a previously revealed one or more menu item in response to dragging input in a second opposing direction. In this case, to highlight the desired 'most used' menu item, the user continues the dragging gesture of FIG. 3c in the opposite direction (i.e. up in this case). This hides the topmost 'last used' menu item (312c) and highlights the 'most used' menu item (312b) (as depicted in FIG. 3d). In this way the most recently revealed item which is visible is highlighted.

Figure 3E:
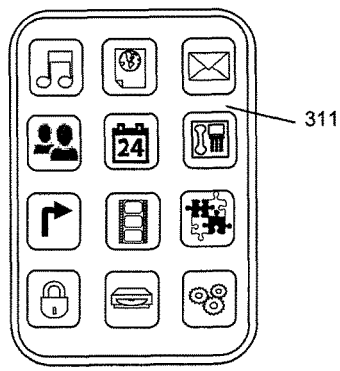

In order to select the highlighted menu item, the user releases his finger from the screen after the highlighted menu item has been highlighted for an uninterrupted time period exceeding a predetermined time period (e.g. selection may be enabled by highlighting a particular menu item for a time period exceeding 0.3 seconds) to complete the progressive dragging input gesture. It will be appreciated that other example embodiments may enable selection regardless of how long the menu item is highlighted. In this case, this embodiment is configured to automatically implement the selected option upon detection of completion of the dragging input gesture. As shown in FIG. 3e, the home screen user interface element returns to its original position, and the icons are arranged according to the selected menu item. It will be appreciated that other example embodiments may require further user input (e.g. a confirmation) before automatically implementing the selected menu item. The means of selecting may be a processor configured to select the highlighted menu item In this way, functions such as sorting contents in a view or changing the display mode, for example, is easily accessible using a single progressive dragging user input, but does not require any screen area to be devoted to these functions. That is, the entire screen can be devoted to displaying the application icons.

It will be appreciated that the menu may be on any edge of the user interface element. For example, there may be menu items revealed by moving the user interface element to the left or to the right. Having the menu being revealed from the top edge may reduce the risk of, for example, the hand, finger or other stylus obscuring the menu or user interface element. It will be appreciated that other example embodiments may comprise a plurality of menus wherein each respective menu may be revealed depending on the direction of the progressive dragging user input.

It will be appreciated that the functions of scrolling a user interface element and revealing one or more menu items may be combined. For example, an application screen may be dragged in a direction (e.g. scrolled upwards) to reveal more application content, and when all the application screen content has been revealed, the apparatus is configured to reveal the one or more menu items (e.g. when the application screen is dragged further in the same direction).

It will be appreciated that other example embodiments may be configured such that one or more of the menu items are not available for selection. For example, in the above case, the user may have configured the menu such that the 'default' menu item can be revealed but not selected/highlighted. It will be appreciated that in this case, the most recently revealed item which is visible and is available for highlighting may be highlighted.

It will be appreciated that in other example embodiments the apparatus may be configured to display the menu and its options on top of the displayed user interface elements. For example, example embodiments may be configured such that the user interface elements are not adjusted or moved on the display as the progressive dragging input gesture is being detected. For example, the menu may be displayed in a transparent manner so that the user interface elements can be seen slightly below the menu options.

It will be appreciated that the position of the revealed menu items may be related to the position of the progressive dragging input gesture. For example, if the user touches on an application icon, the menu items may be revealed next to the touching point. The position of the revealed menu items may be, for example, below, above, to the right or to the left of the progressive dragging input gesture (e.g. relative to the stylus or cursor providing the progressive dragging input gesture).

Figure 4A:
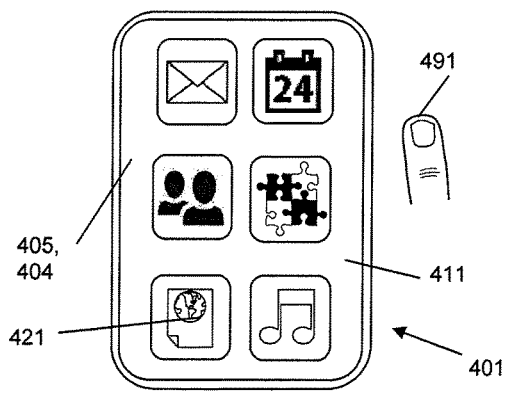
FIG. 4a-4d depicts a further example embodiment comprising a mobile telephone with a graphical user interface configured to enable multiple menu items to be displayed at the same time.

FIG. 4a depicts a further example embodiment comprising a portable electronic communications device (401), e.g. such as a mobile phone, with a user interface comprising a touch-screen user interface (405, 404), a memory (not shown), a processor (not shown) and an antenna (not shown) for transmitting and/or receiving data (e.g. emails, textual messages, phone calls, information corresponding to web pages).

FIGS. 4a-4d depict the example embodiment of FIG. 4a as the user is interacting with the device. FIG. 4a depicts the home screen (411) of the electronic device when the device is first turned on. In this case, the home screen may be considered to be an application launching screen. The home screen depicts an array of icons (421) wherein each icon represents a different application available to the user. In this case the applications comprise an email client, a calendar application, a messaging application, a games application, a web browser application and a music player application.

In this case, the embodiment is configured to allow the device to be in a number of different modes, for example, a mute mode (in which the ring tone is suppressed), a locked mode (in which the user interface is deactivated), an off mode, and an aeroplane mode (in which transmission/receiving functions are deactivated).

This example embodiment is configured to, in response to detecting a progressive dragging input gesture provided by a user via a graphical user interface, enable:

moving a displayed user interface element (which in this case is the home screen (411)) of the graphical user interface to reveal one or more menu items, such that the one or more revealed menu items are visible;

highlighting at least one said visible menu item in correspondence with the progressive dragging input gesture; and selecting the highlighted menu item in response to detecting the completion of the progressive dragging input gesture.

Figure 4B:
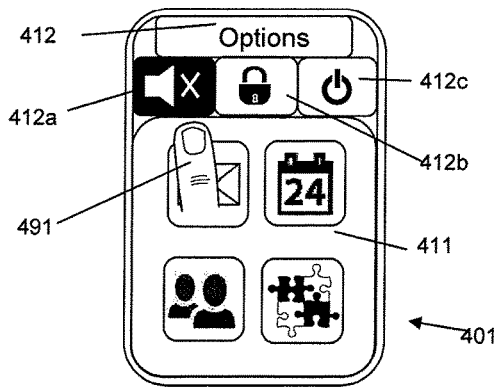

In FIG. 4b, the user has initiated a dragging gesture by contacting his finger (491) on the surface of the touch screen (404) above the email application icon, and has dragged his finger (491) down whilst remaining in contact with the touch screen (it will be appreciated that other example embodiments may be configured to detect a stylus when the stylus is not in contact with the touch screen). This embodiment is configured to recognise an input gesture as a progressive dragging input gesture based on the position of the gesture initiation. That is, if the finger is initially placed in contact with the screen outside a user application icon, this embodiment is configured to recognise that the input is associated with the home screen user interface element. If the finger is initially placed in contact with the screen within a user application icon, this embodiment is configured to recognise that the input is associated with the corresponding user application icon (and is not a progressive dragging input gesture associated with the home screen user interface element). For example, an example embodiment may be configured such that, when the input is provided via a user interface element (e.g. an application icon) the menu items are related to the corresponding user interface element (e.g. the user application associated with the application icon). For example, in the example of an email application icon, the menu options revealed may comprise 'Check for new mail', 'Compose new mail', 'Open new mail', 'Open' and/or the like.

In response to this progressive dragging input in a first direction (downwards in this example), the embodiment is configured to move the displayed home screen user interface element (411) to reveal one or more menu items of the plurality of menu items (associated with the available modes of the device) so that the revealed menu items are visible. Unlike the previous embodiment, this embodiment is configured such that the user perceives that the menu (412) is in a plane positioned below the home screen user interface element (411), and the menu (412) is fixed with respect to the touch screen as the home screen user interface element (411) moves. That is, the user perceives that the menu (412) is being revealed as the home screen user interface element (411) is dragged down.

Unlike the previous embodiment, wherein the menu items (412a-412c) were arranged in the direction of the revealing, in this case, the menu items (412a-412c) are arranged perpendicularly to the direction of revealing. As the user's finger is initially on the left of the screen when the menu items (412a-412c) are revealed, the leftmost 'mute' menu item (412a) is initially highlighted. In this embodiment, menu items are indicated as being highlighted by having a black background. Menu items which are not highlighted have a white background.

Highlighting a menu item, in this case, comprises distinguishing the menu item with respect to other menu items by making the highlighted menu item a different background colour to at least one other non-highlighted menu item.

Figure 4C:
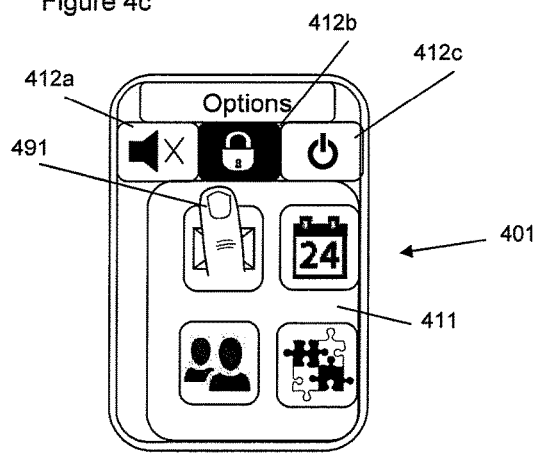
Figure 4D:
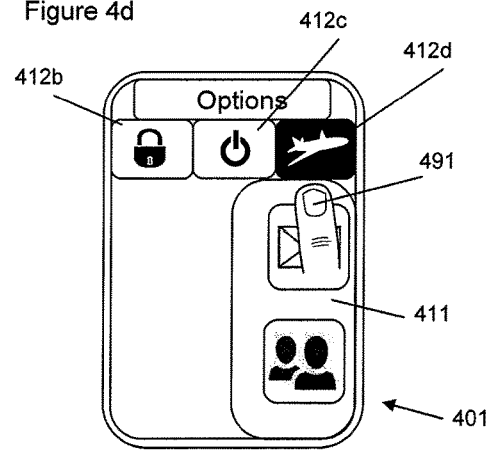

In FIG. 4c, after the one or more menu items (412a-412c) are revealed, the user has continued the dragging motion of FIG. 4b in a direction perpendicular to the revealing direction. This allows the user to select one of the revealed menu items (412a-412c). In this situation depicted in FIG. 4c, the user has dragged his finger to the right which selects the corresponding locked mode menu item (412b). In this way, as the user progressively drags his finger (491) in the right-left highlighting direction, different menu items are highlighted. In this case, dragging across the screen in the second direction scrolls through the menu (412) to reveal further menu items (412d) which are user perceived to be located off screen. In the situation depicted in FIG. 4c, the user has scrolled the one dimensional menu to reveal and highlight the aeroplane mode menu item (412d). That is, the apparatus/embodiment is configured to respond to progressive dragging input in a two dimensional plane, wherein input in a first direction of the two dimensional plane enables moving of the user interface element in the first direction (down, in this case) to reveal the one or more menu items and input in a second perpendicular direction (left-right, in this case) of the two dimensional plane enables correspondingly highlighting of a revealed menu item. In this case, the revealed menu items are listed in the second perpendicular direction.

In order to select the highlighted menu item, the user releases his finger from the screen to complete the progressive dragging input gesture. In this case, this embodiment is configured to automatically implement the selected option. In this example embodiment, the home screen is configured to automatically return to its original position (as depicted in FIG. 4a). That is, when the aeroplane mode has been selected, transmitting and receiving functions are prevented.

In this case, a single menu item is selected at a time. It will be appreciated that for other example embodiments, more than one menu item (e.g. menu items which are not mutually exclusive or can be implemented at the same time) may be highlighted and selected using a single progressive dragging input gesture. For example, an embodiment having the same menu item as the embodiment of FIG. 4 may be configured to enable highlighting and selection of the mute mode and the aeroplane mode at the same time. This may allow the user to turn of the sound and the transmitting/receiving functions using a single progressive dragging input gesture.

Figure 4E:
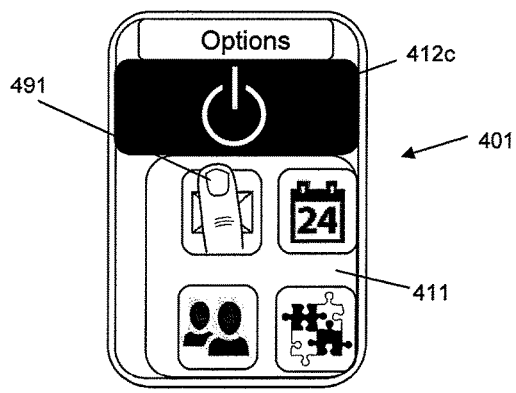
FIGS. 4e and 4f depicts the embodiment of FIG. 4a, the graphical user interface, in this case, being configured to reveal one menu item at a time.
Figure 4F:
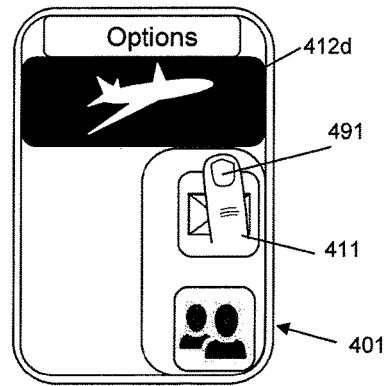

In each of the previous embodiments more than one menu item may be revealed at a time. It will be appreciated that in other examples, the embodiment may be configured such that a single menu item is revealed at a time. FIGS. 4e and 4f depict the embodiment of FIG. 4a, the graphical user interface, in this case, being configured to reveal one menu item at a time. In this case, when the user scrolls the menu items (the menu items having been already revealed) to highlight a particular menu item by dragging his finger (491) (or other stylus) in a second highlighting direction, the next menu item (412d) in sequence is revealed by overwriting the visible menu item (412c). That is, in the situation depicted in FIG. 4f, the aeroplane mode menu item (412d) has been revealed and highlighted (in response to a portion of the progressive dragging input gesture) by overwriting the off mode menu item (412c) (depicted in FIG. 4e). In this case, the revealed menu item is highlighted by the fact that it is revealed for selection (having previously been hidden).

Figure 5A:
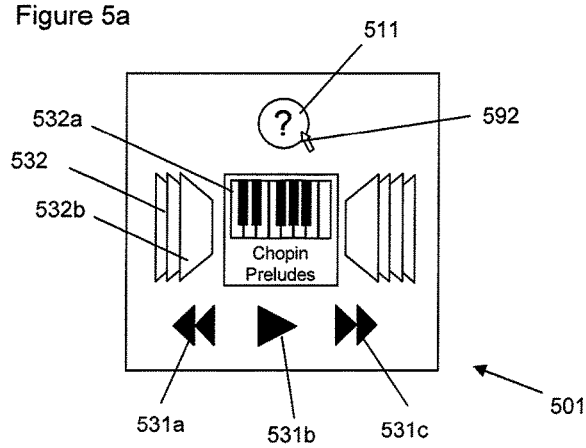
FIG. 5a-5f depicts a further example embodiment comprising a computer display.

FIG. 5a depicts the display (304) of a further example embodiment comprising an electronic device, e.g. such as a computer, a memory (not shown), and a processor (not shown).

FIGS. 5a-5f depict the example embodiment of FIG. 5a as the user is interacting with the device. FIG. 5a depicts a music application screen of the electronic device. The music application screen comprises: control icons (531a-c) including a 'skip back' control icon (531a), a 'play' control icon (531b); and a 'skip forward' control icon (531c); a album array (532) indicating the currently selected album (532a) and allowing the user to scroll through available albums (532b); and a rating icon user interface element (511) configured to display a rating value assigned by the user. In this situation depicted in FIG. 5a, the rating icon user interface element (511) is configured to indicate a '?' question mark symbol denoting that the corresponding selected album (532a) has not been assigned a rating.

In this case, the user interacts with the music application using a cursor (592) which is controlled by a mouse (not shown). It will be appreciated that other example embodiments may be configured to enable control of a cursor using a touchpad or a wand.

This example embodiment is configured to, in response to detecting a progressive dragging input gesture provided by a user via a graphical user interface, enable:

moving a displayed user interface element (which in this case is the rating icon user interface element (511)) of the graphical user interface to reveal one or more menu items, such that the one or more revealed menu items are visible;

highlighting at least one said visible menu item in correspondence with the progressive dragging input gesture; and selecting the highlighted menu item in response to detecting the completion of the progressive dragging input gesture.

Figure 5B:
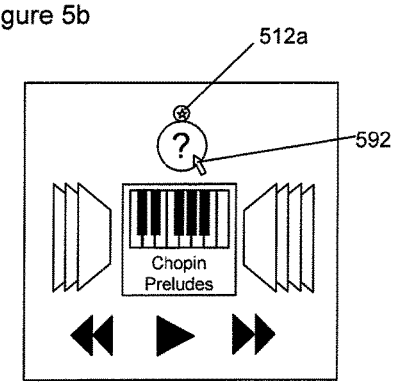

In FIG. 5b, the user has initiated a dragging gesture by clicking on the rating icon user interface element (511) and whilst holding the mouse button down dragging the cursor (592). In response to this progressive dragging input in a first direction, the embodiment is configured to move the ratings icon user interface element to reveal the first menu item option (a single star) (512a) of the plurality of menu item options so that the revealed menu items are visible. In this case, the embodiment is configured such that the user perceives that the menu (512) is in a plane below the ratings icon user interface element, and the menu (512) is fixed with respect to the display as the rating icon user interface element (511) moves. That is, the user perceives that the menu (512) is being revealed as the rating icon user interface element (511) is dragged down.

Unlike the previous example, wherein the most recently revealed item which is visible is highlighted, in this embodiment, all of the revealed menu items are highlighted to enable selection. In the situation depicted in FIG. 5b, only the '1 star' menu item has been revealed and so it can be considered to be highlighted (although not explicitly distinguished to the user as all revealed items are selectable). In this way, a said visible menu item of the plurality of menu items is highlighted in correspondence with the progressive dragging input gesture. That is unlike previous embodiments, highlighting in this case is such that it is apparent to a user which menu item or menu items is provisionally selected by revealing of the menu items themselves given that they were previously unseen and also by the cumulative nature of the rating which is being input.

Figure 5C:
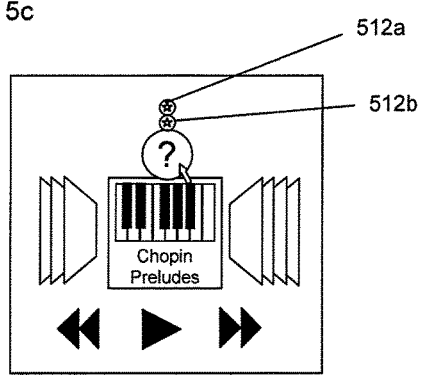
Figure 5D:
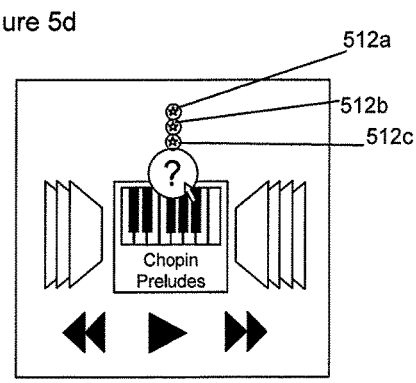

In FIG. 5c, the user has continued the dragging motion of FIG. 5b further along the same direction. This has revealed a further star (512b). It will be appreciated that completing the progressive dragging input gesture at this stage would select both revealed stars and correspond to a 'two-star' rating. In FIG. 5d, the user has continued the dragging motion of FIG. 5c further along the same direction. This has revealed a further star (corresponding to a 'three star' rating) (512c).

Figure 5E:
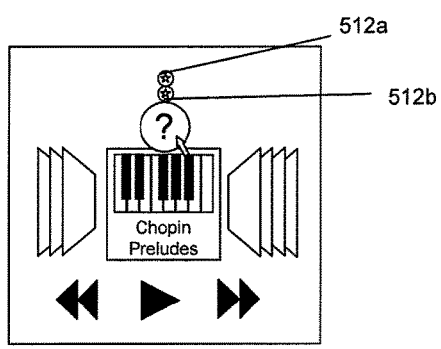

However, the user wishes to give the selected album a 'two star' rating. The menu items corresponding to this option has already been revealed and is visible. This embodiment is configured to enable input moving of the user interface element in the opposing direction to hide a previously revealed one or more menu item in response to dragging input in a second opposing direction. In this case, to highlight the desired menu items corresponding to a 'two star' rating, the user continues the dragging gesture of FIG. 5d in the opposite direction (i.e. up in this case). This hides the third star menu item (512c) and highlights the first and second stars (512a, 512b) menu item (as depicted in FIG. 5e).

Figure 5F:
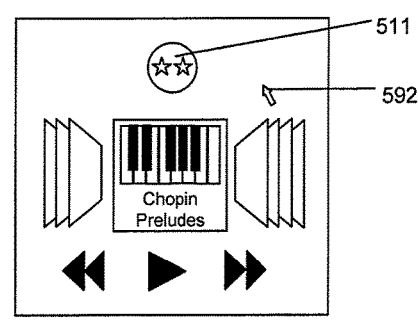

In order to select the highlighted menu items, the user releases his finger from the screen to complete the progressive dragging input gesture. In this case, this embodiment is configured to automatically implement the selected options. As shown in FIG. 5f, the rating icon user interface element (511) returns to its original position, and is configured to indicate the selected 'two star' rating.

Figure 6A:
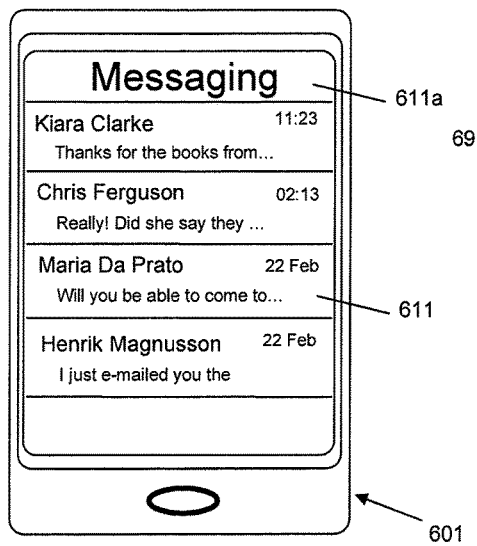
FIG. 6a-6d depicts a further example embodiment comprising a mobile telephone.

FIG. 6a depicts a further example embodiment comprising a portable electronic communications device (601), e.g. such as a mobile phone, with a user interface comprising a touch-screen user interface (605, 604), a memory (not shown), a processor (not shown) and an antenna (not shown) for transmitting and/or receiving data (e.g. emails, textual messages, phone calls, information corresponding to web pages).

FIGS. 6a-6d depict the example embodiment of FIG. 6a as the user is interacting with the device. FIG. 6a depicts a messaging application screen of the electronic device. The messaging application screen (611) comprises a header (611a) indicating the application, and a list of messaging conversations.

In this case, the embodiment is configured to enable a number of different applications to be run, for example, an email application, a calendar application, a games application and a music application.

This example embodiment is configured to, in response to detecting a progressive dragging input gesture provided by a user via a graphical user interface, enable:

moving a displayed user interface element (which in this case is the application screen (611)) of the graphical user interface to reveal one or more menu items, such that the one or more revealed menu items are visible;

highlighting at least one said visible menu item in correspondence with the progressive dragging input gesture; and selecting the highlighted menu item in response to detecting the completion of the progressive dragging input gesture.

Figure 6B:
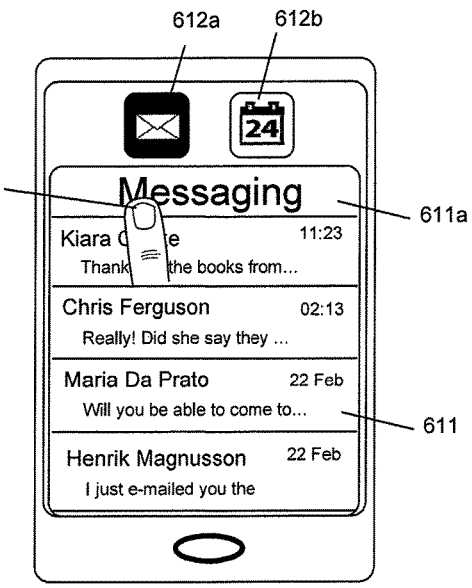

In FIG. 6b, the user has initiated a dragging gesture by contacting his finger on the surface of the touch screen within the header region (611a) of the application user interface element (611) and by dragging his finger down (a first direction) whilst remaining in contact with the touch screen (it will be appreciated that other example embodiments may be configured to detect a stylus when the stylus is not in contact with the touch screen). In response to this progressive dragging input in a first direction, the embodiment is configured to move the displayed home screen user interface element to reveal one or more menu item of the plurality of menu items so that the revealed menu items are visible. Like the previous embodiment, this embodiment is configured such that the user perceives that the menu is in a plane positioned below the home screen user interface element, and the menu is fixed with respect to the touch screen as the home screen user interface element moves. That is, the user perceives that the menu is being revealed as the home screen user interface element is dragged down.

In this embodiment, the progressive dragging input gestures may be initiated within the header (611a) of the user interface element. That is, user inputs which are not initiated within the header of the user interface element will not be recognised as a progressive dragging input gesture. By restricting the positions available to enter progressive dragging input gestures, the embodiment may distinguish progressive dragging input gestures from other user inputs (e.g. to interact with the application). This may prevent unintended revealing of the menu and unintended highlighting and selection.

Unlike the previous embodiment, wherein the menu items were arranged just in the direction of the revealing, in this case, the menu items (612a-d) are arranged in a two-dimensional array.

Figure 6C:
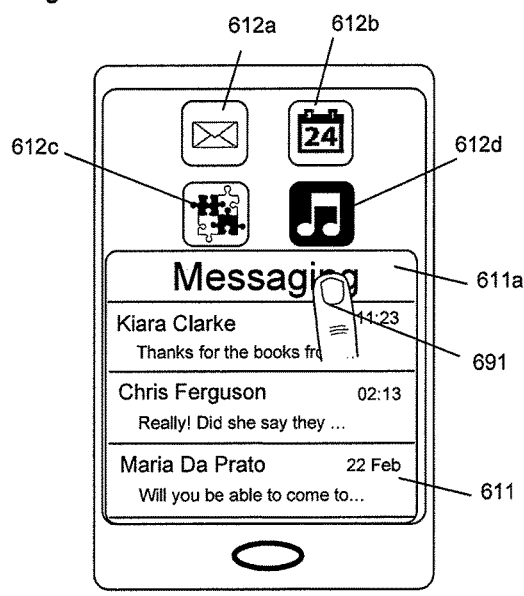

In FIG. 6c, the user has continued the dragging motion of FIG. 6b in the same direction to reveal further menu items (612c-612d) and in a direction perpendicular to the revealing direction to highlight the right hand most recently revealed menu item (612d). This allows the user to highlight one of the revealed menu items, corresponding music application icon. Highlighting a menu item, in this case, comprises distinguishing the menu item with respect to other menu items by making the highlighted menu item a different background colour to at least one other non-highlighted menu item. That is, the highlighted menu item has a black background, whereas a non-highlighted menu item has a white background.

Figure 6D:
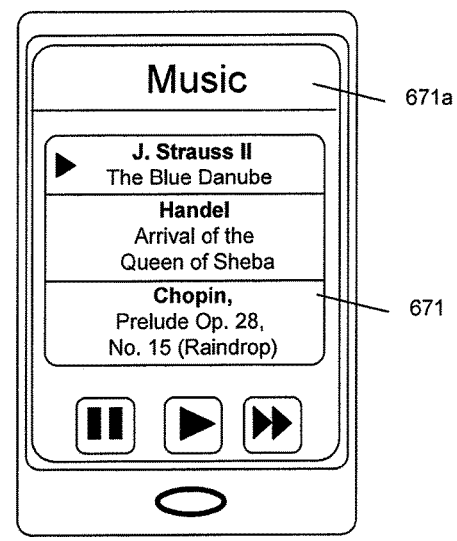

In order to select the highlighted menu item, the user releases his finger (691) from the screen (604) to complete the progressive dragging input gesture. In this case, this embodiment is configured to automatically implement the selected option. In this example embodiment, the selected music application (671) is opened (as depicted in FIG. 6d). It will be appreciated that a menu may be revealed by performing a progressive dragging input gesture initiated on the header (671) of the music application (671).

Figure 7A:
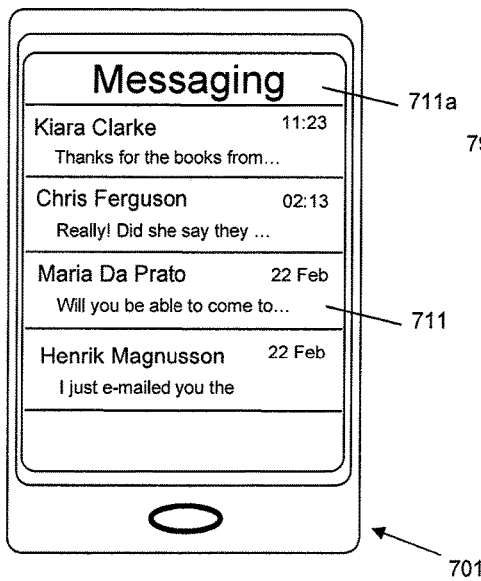
FIG. 7a-7d depicts a further example embodiment comprising a mobile telephone.

FIG. 7a depicts a further example embodiment comprising a portable electronic communications device (701), e.g. such as a mobile phone, with a user interface comprising a touch-screen user interface (705, 704), a memory (not shown), a processor (not shown) and an antenna (not shown) for transmitting and/or receiving data (e.g. emails, textual messages, phone calls, information corresponding to web pages).

FIGS. 7a-7d depict the example embodiment of FIG. 7a as the user is interacting with the device. FIG. 7a depicts a messaging application screen of the electronic device. The messaging application screen (711) comprises a header (711a) indicating the application, and a list of messaging conversations.

Like the previous embodiment, this example embodiment is configured to enable a number of different applications to be run, for example, an email application, a calendar application, a games application and a music application.

This example embodiment is configured to, in response to detecting a progressive dragging input gesture provided by a user via a graphical user interface, enable:
revealing one or more menu items, such that the one or more revealed menu items are visible;
highlighting at least one said visible menu item in correspondence with the progressive dragging input gesture; and
selecting the highlighted menu item in response to detecting the completion of the progressive dragging input gesture.

Unlike the previous embodiment wherein the user interface element was moved to reveal the one or more menu items, this example embodiment is configured to reveal the one or more menu items without moving a user interface element.

Figure 7B:
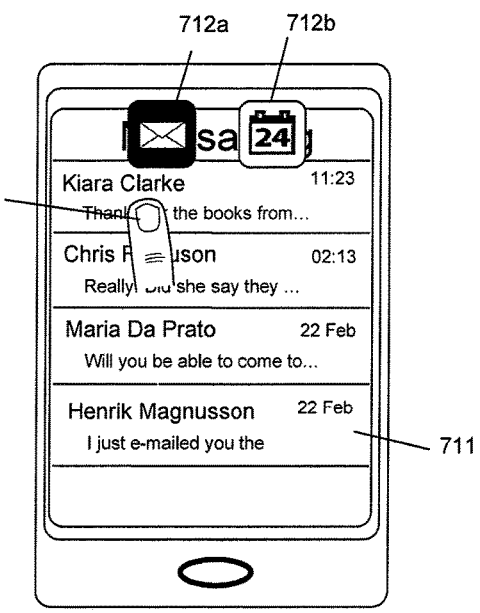

In FIG. 7b, the user has initiated a dragging gesture by contacting his finger on the surface of the touch screen within the header region (711a) of the application user interface element (711) and by dragging his finger down (a first direction) whilst remaining in contact with the touch screen (it will be appreciated that other example embodiments may be configured to detect a stylus when the stylus is not in contact with the touch screen). In response to this progressive dragging input in a first direction, the embodiment is configured to reveal one or more menu item of the plurality of menu items so that the revealed menu items are visible (without moving the displayed home screen user interface element). That is, unlike the previous embodiment, this embodiment is configured such that the user perceives that the menu is in a plane positioned above the home screen user interface element. Although the menu items are opaque, the regions between the menu items are transparent (or translucent) such that the user can still see the user interface elements underlying the revealed menu.

In this embodiment, the progressive dragging input gestures may be initiated within the header (711a) of the user interface element. That is, user inputs which are not initiated within the header of the user interface element will not be recognised as a progressive dragging input gesture. By restricting the positions available to enter progressive dragging input gestures, the embodiment may distinguish progressive dragging input gestures from other user inputs (e.g. to interact with the application). This may prevent unintended revealing of the menu and unintended highlighting and selection.

Like the previous embodiment, wherein the menu items were arranged just in the direction of the revealing, in this case, the menu items (712a-d) are arranged in a two-dimensional array.

Figure 7C:
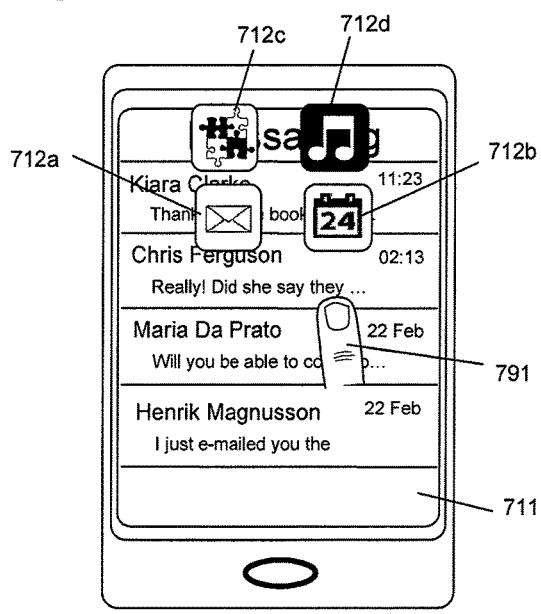
Figure 7D:
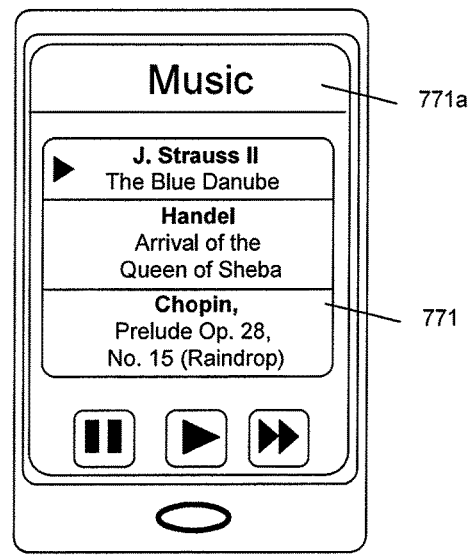
Figure 8:
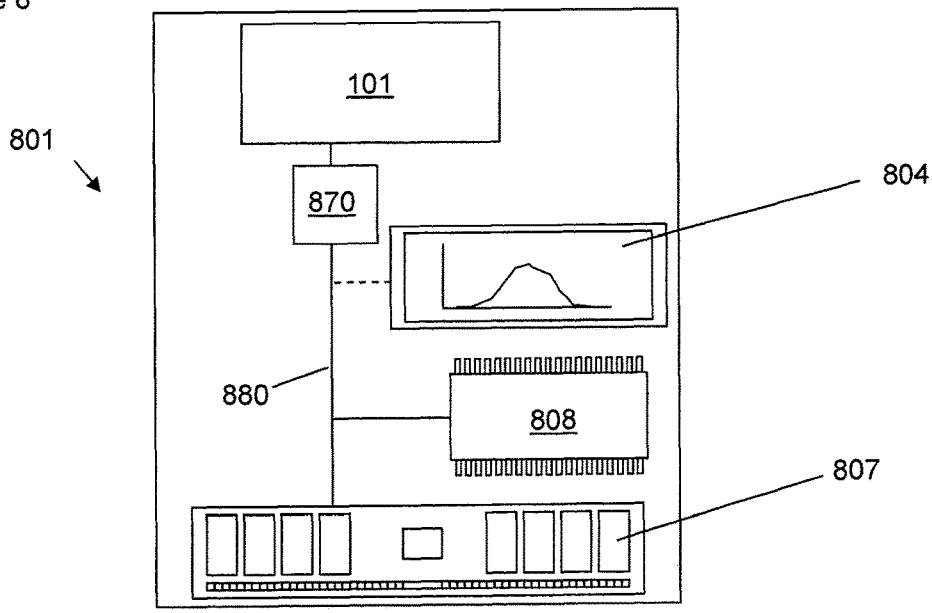
FIG. 8 depicts an embodiment comprising a number of electronic components, including memory, a processor and a communication unit.

In FIG. 7c, the user has continued the dragging motion of FIG. 6b in the same direction to reveal further menu items (712c-612d) and in a direction perpendicular to the revealing direction to highlight the right hand most recently revealed menu item (712d). This allows the user to highlight one of the revealed menu items, corresponding music application icon. Highlighting a menu item, in this case, comprises distinguishing the menu item with respect to other menu items by making the highlighted menu item a different background colour to at least one other non-highlighted menu item. That is, the highlighted menu item has a black background, whereas a non-highlighted menu item has a white background.

In order to select the highlighted menu item, the user releases his finger (791) from the screen (704) to complete the progressive dragging input gesture. In this case, this embodiment is configured to automatically implement the selected option. In this example embodiment, the selected music application (771) is opened (as depicted in FIG. 6d). It will be appreciated that a menu may be revealed by performing a progressive dragging input gesture initiated on the header (771) of the music application (771).

It will be appreciated that other example embodiments configured to reveal the one or more menu items without moving the graphical user interface may be configured such that the one or more menu items are displayed in a one dimensional array (e.g. parallel to or perpendicular to the dragging direction).

Advantages of embodiments may include that the menu does not require dedicated screen area to be accessible. In addition, embodiments may be configured such that the menu may be opened by touching any part of the screen (e.g. by moving the home or application screen). It will be appreciated that a menu item may be highlighted and selected using a single sliding gesture.

FIG. 7 depicts an further example embodiment of an electronic device (801), such as a tablet personal computer, a portable electronic device, a portable telecommunications device, a server or a module for such a device, the device comprising the apparatus (101) of FIG. 1. The apparatus (101) can be provided as a module for device (801), or even as a processor/memory for the device (801) or a processor/memory for a module for such a device (801). The device (801) comprises a processor (808) and a storage medium (807), which are connected (e.g. electrically and/or wirelessly) by a data bus (880). This data bus (880) can provide an active coupling between the processor (808) and the storage medium (807) to allow the processor (808) to access the computer program code. It will be appreciated that the components (e.g. memory, processor) of the device/apparatus may be linked via cloud computing architecture. For example, the storage device may be a remote server accessed via the internet by the processor.

The apparatus (101) in FIG. 7 is connected (e.g. electrically and/or wirelessly) to an input/output interface (870) that receives the output from the apparatus (101) and transmits this to the device (801) via data bus (880). Interface (870) can be connected via the data bus (880) to a display (804) (touch-sensitive or otherwise) that provides information from the apparatus (101) to a user. Display (804) can be part of the device (801) or can be separate. The device (801) also comprises a processor (808) configured for general control of the apparatus (101) as well as the device (801) by providing signalling to, and receiving signalling from, other device components to manage their operation.

The storage medium (807) is configured to store computer code configured to perform, control or enable the operation of the apparatus (101). The storage medium (807) may be configured to store settings for the other device components. The processor (808) may access the storage medium (807) to retrieve the component settings in order to manage the operation of the other device components. The storage medium (807) may be a temporary storage medium such as a volatile random access memory. The storage medium (807) may also be a permanent storage medium such as a hard disk drive, a flash memory, a remote server (such as cloud storage) or a non-volatile random access memory. The storage medium (807) could be composed of different combinations of the same or different memory types.

Figure 9:
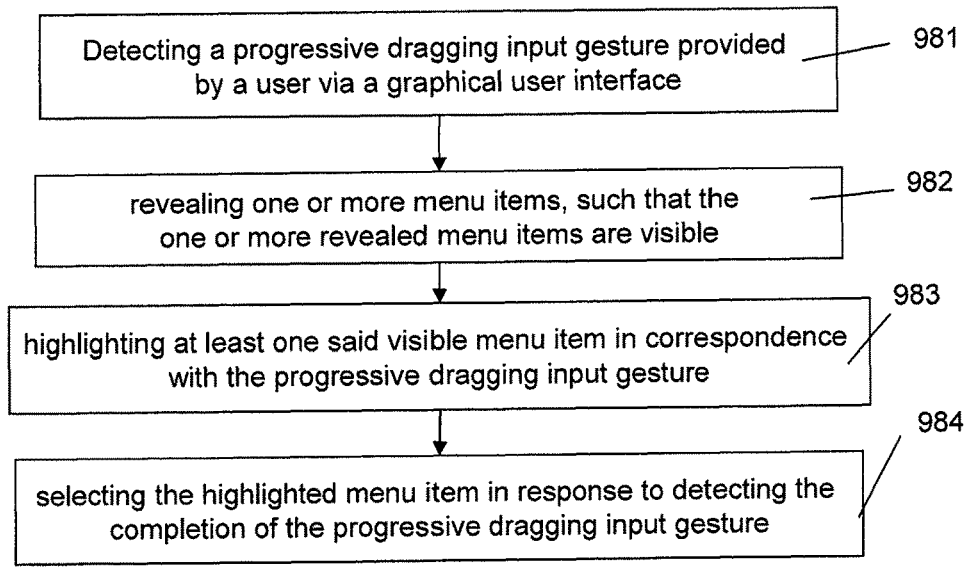
FIG. 9 depicts a flow diagram describing changing a tactile user interface region from a two-dimension configuration to a second configuration

FIG. 9 illustrates the process flow according to an example embodiment of the present disclosure.

The process comprises detecting (981) a progressive dragging input gesture provided by a user via a graphical user interface. As described above, there are a number of different ways in which a user can provide this input. The method process further comprises revealing (982) one or more menu items, such that the one or more revealed menu items are visible. The method further comprises highlighting (983) at least one said visible menu item in correspondence with the progressive dragging input gesture. In this way the selectable menu items can be indicated to the user. The method process further comprises selecting (984) the highlighted menu item in response to detecting the completion of the progressive dragging input gesture. When the dragging input gesture has been detected to have been completed, the highlighted menu item can be selected. For example, when the highlighted menu item is an action or a function associated with an application, selecting the highlighted menu item causes the action or function to be performed.

Figure 10:
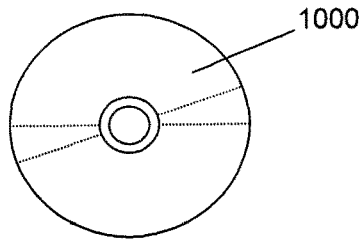
FIG. 10 illustrates schematically a computer readable media providing a program according to an example embodiment.

FIG. 10 illustrates schematically a computer/processor readable media (1000) providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The invention claimed is:

1. An apparatus comprising:
a processor; and
a memory including computer program code,
the memory and the computer program code configured to, with the processor, cause the apparatus to perform at least the following:
  in response to detecting a progressive dragging input gesture in a first direction provided by a user via a graphical user interface, enable:
    moving a displayed whole screen user interface element or window user interface element of the graphical user interface to reveal one or more rows or columns comprising menu items arranged in the respective rows or columns substantially perpendicular to the first direction, such that the one or more rows or columns of revealed menu items are visible;
    highlighting an initial menu item in the most recently revealed row or column in correspondence with the progressive dragging input gesture in the first direction, wherein the highlighted most recently revealed row or column and the initial menu item in the most recently revealed row or column changes as additional rows or columns are revealed;
    receiving an indication of a change of direction of the progressive dragging input gesture in a second direction, substantially perpendicular to the first direction, and in response thereto, changing the highlighting to a next menu item in the most recently revealed row or column in correspondence with the progressive dragging input in the second direction; and
    automatically performing a function associated with the highlighted menu item in response to detecting a release of the progressive dragging input gesture.

2. The apparatus of claim 1, wherein the displayed whole screen user interface element is a discrete graphical element, an application screen, a home screen, or an application launching screen.

3. The apparatus of claim 1, wherein the apparatus is configured to enable the one or more menu items to be revealed progressively in correspondence with the progressive dragging input gesture.

4. The apparatus of claim 1, wherein the apparatus is configured to respond to progressive dragging input in a two dimensional plane, wherein input in a first direction of the two dimensional plane enables moving of the user interface element in the first direction to reveal the one or more menu items and input in a second perpendicular direction of the two dimensional plane enables correspondingly highlighting of a revealed menu item.

5. The apparatus of claim 1, wherein the apparatus is configured to respond to progressive dragging input in a two dimensional plane, wherein input in a first direction of the two dimensional plane enables moving of the user interface element in the first direction to reveal the one or more menu items and input in a second perpendicular direction of the two dimensional plane enables correspondingly highlighting of a revealed menu item listed in the second perpendicular direction.

6. The apparatus of claim 1, wherein the apparatus is configured to respond to progressive dragging input along an axis, wherein input in a first direction along the axis enables moving of the user interface element in the first direction to reveal one or more of the menu items as well as enables correspondingly highlighting a revealed menu item.

7. The apparatus of claim 1, wherein the apparatus is configured to respond to progressive dragging input along an axis, wherein input in a first direction along the axis enables moving of the user interface element in the first direction to reveal one or more of the menu items as well as enables correspondingly highlighting a revealed menu item listed in first direction.

8. The apparatus of claim 1, wherein the apparatus is configured to respond to progressive dragging input along an axis, wherein input in a first direction along the axis enables moving of the user interface element in the first direction to reveal the one or more menu items as well as enables correspondingly highlighting of a revealed menu item and input in the second opposing direction along the axis enables moving of the user interface element in the opposing direction to hide a previously revealed one or more menu item.

9. The apparatus of claim 1, wherein the apparatus is configured to enable two or more of the menu items to be revealed simultaneously in a perpendicular direction to the direction of progressive dragging input.

10. The apparatus of claim 1, wherein the apparatus is configured to reveal and highlight further menu items whilst hiding previously revealed menu items in a scrolling manner in correspondence with the progressive dragging input gesture.

11. The apparatus of claim 1, wherein the highlighted menu item is the last revealed visible menu item.

12. The apparatus of claim 1, wherein the one or more menu items are associated with at least one of: the user interface element, a mode of the device, a particular function, a particular file and a settings item.

13. The apparatus of claim 1, wherein the apparatus is configured to, when the user interface element is being moved, enable the position of the one or more menu items to be fixed with respect to the user interface element; or to be fixed with respect to the graphical user interface.

14. The apparatus of claim 1, wherein the menu items are arranged in a one-dimensional, two-dimensional or three-dimensional array.

15. The apparatus of claim 1, wherein the apparatus is configured to detect single touch input gestures and multi-touch gestures, and wherein the apparatus is configured to recognise multi-touch gestures as a said progressive dragging input gesture.

16. The apparatus of claim 1, wherein the apparatus is or forms part of at least one of the electronic device, a portable electronic device, circuitry for a portable electronic device, a television, a tablet computer, a laptop computer, a desktop computer, a mobile phone, a Smartphone, a tablet PC, a monitor, a car entertainment system, a satellite navigation system, a game controller, an automated teller machine, a cash machine, a personal digital assistant, a digital camera, a server or a module for the same.

17. A method, the method comprising:
  in response to detecting a progressive dragging input gesture in a first direction provided by a user via a graphical user interface, enabling:
    moving a displayed whole screen user interface element or window user interface element of the graphical user interface to reveal one or more rows or columns comprising menu items arranged in the respective rows or columns substantially perpendicular to the first direction, such that the one or more rows or columns of revealed menu items are visible;
    highlighting an initial menu item in the most recently revealed row or column in correspondence with the progressive dragging input gesture in the first direction, wherein the highlighted most recently revealed row or column and the initial menu item in the most recently revealed row or column changes as additional rows or columns are revealed;
    receiving an indication of a change of direction of the progressive dragging input gesture in a second direction, substantially perpendicular to the first direction, and in response thereto, changing the highlighting to a next menu item in the most recently revealed row or column in correspondence with the progressive dragging input in the second direction; and
    automatically performing a function associated with the highlighted menu item in response to detecting a release of the progressive dragging input gesture.

18. A computer program product comprising computer program code stored on a non-transitory storage medium, the computer program code configured to:
  in response to detecting a progressive dragging input gesture in a first direction provided by a user via a graphical user interface, enable:
    moving a displayed whole screen user interface element or window user interface element of the graphical user interface to reveal one or more rows or columns comprising menu items arranged in the respective rows or columns substantially perpendicular to the first direction, such that the one or more rows or columns of revealed menu items are visible;
    highlighting an initial menu item in the most recently revealed row or column in correspondence with the progressive dragging input gesture in the first direction, wherein the highlighted most recently revealed row or column and the initial menu item in the most recently revealed row or column changes as additional rows or columns are revealed;
    receiving an indication of a change of direction of the progressive dragging input gesture in a second direction, substantially perpendicular to the first direction, and in response thereto, changing the highlighting to a next menu item in the most recently revealed row or column in correspondence with the progressive dragging input in the second direction; and
    automatically performing a function associated with the highlighted menu item in response to detecting a release of the progressive dragging input gesture.

19. The apparatus of claim 1, wherein the one or more menu items are revealed in a plane below the moved displayed user interface element.

20. The apparatus of claim 1, wherein the apparatus is configured to:
  enable the displayed whole screen user interface element or window user interface element of the graphical user interface to be moved to successively reveal a plurality of menu items in correspondence with the progressive dragging input gesture; and
  enable the plurality of menu items to be successively highlighted in correspondence with the progressive dragging input gesture.

\* \* \* \* \*